United States Patent [19] [11] 4,128,482
Knight [45] Dec. 5, 1978

[54] MOBILITY CONTROL OF AQUEOUS FLUIDS IN POROUS MEDIA

[75] Inventor: Robert K. Knight, Fullerton, Calif.

[73] Assignee: Union Oil Company of California, Brea, Calif.

[21] Appl. No.: 798,920

[22] Filed: May 20, 1977

Related U.S. Application Data

[62] Division of Ser. No. 628,534, Nov. 3, 1975, Pat. No. 4,039,028.

[51] Int. Cl.$^2$ ............................................. E21B 43/22
[52] U.S. Cl. ................................. 252/8.55 D; 166/246
[58] Field of Search ............... 166/273, 274, 275, 246; 252/8.55 D

[56] References Cited

U.S. PATENT DOCUMENTS

| 2,827,964 | 3/1958 | Sandiford et al. | 252/8.55 X |
|---|---|---|---|
| 3,020,953 | 2/1962 | Zerweck et al. | 252/8.55 X |
| 3,039,529 | 6/1962 | McKennon | 252/8.55 X |
| 3,305,016 | 2/1967 | Lindblom et al. | 166/246 |
| 3,684,014 | 8/1972 | Norton et al. | 166/275 |
| 3,707,187 | 12/1972 | Knight | 166/246 |
| 3,746,094 | 7/1973 | Norton et al. | 166/275 |
| 3,760,879 | 9/1973 | Norton et al. | 252/8.55 X |

Primary Examiner—Herbert B. Guynn
Attorney, Agent, or Firm—Richard C. Hartman; Dean Sandford; Gerald L. Floyd

[57] ABSTRACT

A composition and method for providing improved mobility control in secondary and tertiary recovery processes obtained by injecting into a subterranean hydrocarbon-bearing formation, as part of the secondary or tertiary recovery fluid, an aqueous solution of a mixture of a heteropolysaccharide produced by bacteria of the genus Xanthomonas together with a polyacrylamide or a chemically altered derivative of a polyacrylamide.

5 Claims, No Drawings

MOBILITY CONTROL OF AQUEOUS FLUIDS IN POROUS MEDIA

BACKGROUND OF THE INVENTION

FIELD OF THE INVENTION

This is a division of application Ser. No. 628,534, filed Nov. 3, 1975, now U.S. Pat. No. 4,039,028.

This invention relates to a composition for and method of controlling the mobility of aqueous fluids used in secondary and tertiary oil recovery processes. More particularly, the invention relates to such a composition and method wherein a high viscosity is maintained in various aqueous flooding media and the shear degradation of the composition while carrying out the method is minimized.

DESCRIPTION OF THE PRIOR ART

In one manner of carrying out secondary and tertiary oil recovery operations, an aqueous fluid, such as fresh water or a brine, is injected into a subterranean formation which contains residual oil. The aqueous fluid pushes the oil ahead of it through the formation toward a production well. Since the viscosity of the formation oil is usually higher than that of the injected fluid, there is a tendency for the more mobile aqueous fluid to bypass at least a portion of the oil or finger through the oil. This results in only a portion of the residual oil being displaced by the aqueous fluid and recovered. In order to improve the ability of the flooding medium to displace residual oil, it has been the practice to increase the viscosity of the entire flooding medium, or at least a portion thereof, so it is more nearly the same viscosity as the oil. Thus, the mobility of the injected aqueous fluid, at least in part, matches that of the oil and bypassing or fingering is reduced. A wide variety of water-soluble or dispersible polymeric materials have been used as viscosity increasers or thickeners. U.S. Pat. No. 2,827,964 to Sandiford et al. and U.S. Pat. No. 3,039,529 to McKennon describe the use of high molecular weight partially hydrolyzed polyacrylamides as thickening agents for aqueous liquid used as an oil recovery flooding medium. U.S. Pat. No. 3,581,824 to Hurd describes for the same purpose the use of heteropolysaccharides produced by fermentation of carbohydrates by bacteria of the genus Xanthomonas.

The ability of the various classes of polymers to form aqueous solutions capable of serving as oil displacing flooding media varies considerably depending on such factors as: the salinity of the aqueous medium, the physical and chemical characteristics of the formation and the nature of the residual oil. Similar variations can occur between different members of a single class of polymers. Thus, it is known to use mixtures of two or more types of polymers in an effort to obtain certain advantages of each type in the composite flooding medium. For example, U.S. Pat. No. 3,684,014 to Norton et al. describes, as a displacing medium for removing oil from an oil-bearing formation, an aqueous solution containing both a partially hydrolyzed polyacrylamide and a polyalkeneoxide. The displacing medium has an improved "screen factor", a property which relates to the degree of plugging of a formation by flow of a polymer solution. Other polymers, such as biopolymers, i.e. polysaccharides, may be employed in the mixture in place of the polyalkeneoxide. Another approach has been to employ a slug of one polymer solution followed by a slug of another polymer solution. Thus, U.S. Pat. No. 3,724,545 to Knight involves improved mobility control in secondary and tertiary recovery processes by injecting a slug of an aqueous solution of a partially hydrolyzed, high molecular weight polyacrylamide, a permeability reducing agent, followed by a slug of a high molecular weight biopolymer, a viscosity-increasing agent.

In spite of the foregoing advances in the art, there remain many problems in using aqueous polymer solutions for mobility control. Among these problems is the susceptibility of many of the aqueous polymer soluutions to severe shear degradation. As the thickened displacing fluid passes through the formation, it is forced through many small capillaries and small diameter passageways. In so doing, it is subjected to a high degree of shear. Many polymer solutions which initially have a high viscosity and provide good mobility control, rapidly decrease in viscosity when subjected to the shear of being forced through the pores of the formation. This is especially true when the aqueous medium is brine rather than fresh water. When their viscosity decreases, tnese solutions loose much of their ability to control mobility. Hence, need exits for an aqueous polymer solution having high initial viscosity and which is resistant to shear degradation. Another problem is maintenance of high viscosity in aqueous solutions containing water-soluble salts. While low concentrations of some polymers provide high viscosity in fresh water, their viscosity is sharply lower in brine or if the aqueous solution becomes contaminated by brine. Such contamination can occur when a thickened aqueous solution is injected into a formation containing brine.

Accordingly, it is a primary object of this invention to provide an aqueous polymer composition having good mobility control properties and a method of use of such a composition in secondary and tertiary recovery operations.

It is another object of the invention to provide such a composition wherein the viscosity of the composition remains high in the presence of either fresh water or brine.

It is still another object of the invention to provide such a composition and method wherein the mobility control properties of the composition are retained when the composition is subjected to shear.

It is a further object of the invention to provide such a composition and method wherein the mobility control properties of the composition are retained when the composition is injected into and through an oil-containing formation.

Other objects, advantages and features of the invention will become apparent from the following description and appended claims.

SUMMARY OF THE INVENTION

In brief, this invention contemplates a waterflooding composition comprising an aqueous solution containing both a heteropolysaccharide produced by bacteria of the genus Xanthomonas and a polyacrylamide or a chemically altered derivative of a polyacrylamide, such as a partially hydrolyzed polyacrylamide. The invention also contemplates the use of such a composition as an oil-displacing fluid in secondary and tertiary recovery operations wherein the composition is injected into a formation via an input or injection well and oil is withdrawn from the formation via an output or production well.

DETAILED DESCRIPTION OF THE INVENTION

The heteropolysaccharides which may be used in carrying out the present invention are ionic polysaccharides produced by fermentation of carbohydrates by bacteria of the genus Xanthomonas. Examples of such heteropolysaccharides are those produced by *Xanthomonas campestris, Xanthomonas begonia, Xanthomonas phaseoli, Xanthomonas hederae, Xanthomonas incanae, Xanthomonas carotae* and *Xanthomonas translucens*. Of these, ionic polysaccharide B-1459 is preferred. The polysaccharide B-1459 is prepared by culturing the bacterium *Xanthomonas campestris* NRRL B-1459, U.S. Department of Agriculture, on a well-aerated medium containing commercial glucose, organic nitrogen sources, dipotassium hydrogen phosphate and various trace elements. Fermentation is carried to completion in four days or less at a pH of about 7 and a temperature of 28° C. Polysaccharide B-1459 is available under the trade name Biopolymer 9702 rom Enjay Chemical Company, Division of Humble Oil and Refining Co., 60 West 49th St. New York, N.Y., 10020. Production of this heteropolysaccharide is well described in Smiley, K. L. "Microbiol Polysaccharides—A Review", *Food Technology* 20, 9:112–116 (1966) and Moraine, R. A., Rogovin, S. P. and Smiley, K. L. "Kinetics of Polysaccharide B-1459 Synthesis", *J. Fermentation Technol.* 44, 311-312 (1966).

The polyacrylamide and chemically altered derivatives of polyacrylamide which can be used in this invention include the commercially available, water-soluble, high molecular weight, unhydrolyzed or partially hydrolyzed polyacrylamide having molecular weights in the range of above about $0.2 \times 10^6$, preferably from $0.5 \times 10^6$ to $40 \times 10^6$ and more preferably from $3 \times 10^6$ to $10 \times 10^6$. The polymers are substantially free of crosslinking between polymer chains. The hydrolyzed polyacrylamides have up to about 70 percent of the carboxamide groups originally present in the polyacrylamide hydrolyzed to carboxyl groups. Preferably from about 12 to about 45 percent of the carboxamide groups are hydrolyzed to carboxyl groups. Hydrolysis of the acrylamide polymer is accomplished by reacting the same with sufficient aqueous alkali, e.g., sodium hydroxide, to hydrolyze the desired number of amide groups present in the polymer molecule. The resulting products consist of a long hydrocarbon chain, the alternate carbon atoms of which bear either amide or carboxylic groups. Another way of providing a partially hydrolyzed polyacrylamide is by copolymerization of acrylic acid and acrylamide according to well known procedures. The term "hydrolyzed polyacrylamide", as employed herein, is inclusive of the modified polymers wherein the carboxyl groups are in the acid form and also of such polymers wherein the carboxyl groups are in the salt form, provided that the salts are water-soluble. Alkali metals, alkaline earth metals and ammonium salts are preferred. A number of polyacrylamides and partially hydrolyzed acrylamide polymers suitable for use in this invention are commercially available; for example, materials marketed by The Dow Chemical Company under the trade name "Pusher 700", a 15 to 45 percent hydrolyzed polyacrylamide.

In carrying out the invention, the heteropolysaccharide and the polyacrylamide are dissolved in water in any suitable fashion and in any desired order to provide a solution having the desired viscosity. Alternatively, the two organic polymers can be dissolved in brine or a concentrated aqueous solution of the polymers can be diluted with brine to form a solution having ionic constituents similar or identical to those in the connate water in the oil field wherein the secondary or tertiary recovery procedure is to be employed. In a preferred method of operation, the viscous solution is prepared with oil field brine obtained from the producing strata or from strata adjacent to the producing strata whereby undesired changes in the strata by reason of the viscous solution are minimized.

In preparing the aqueous organic polymer solutions, from about 25 to about 75 weight percent of the polymer mixture is a heteropolysaccharide and the remainder is a polyacrylamide or a chemically altered polyacrylamide. It is preferred to use about equal amounts of each polymer genus in the aqueous polymer solution. The concentration of the polymer mixture in the aqueous solution can vary over a wide range, from about 50 p.p.m. to about 5 weight percent. The viscosity of such solutions depends to a large extent on the particular polymers used and on the particular water or brine employed, but can broadly vary from about 2 centipoises (cps.) to several hundred centipoises.

The aqueous organic polymer solution can make up the entire secondary or tertiary recovery medium. However, it is more economical and preferable to inject a slug of the aqueous polymer solution followed by a large volume of drive fluid. The size of the slug of polymer solution to be injected is in the range of from 0.05 to 1 pore volume of the stratum area to be swept by the oil recovery fluid. The driving fluid employed may take any suitable form such as a gas, alternate slugs of gas and water or brine, or water or brine alone.

Preferably there is used in the flooding process in conjunction with the aqueous polymer solution a separate miscible or miscible-like displacement slug of from about 1.0 to 10 percent of the formation pore volume. This miscible displacement slug can be injected ahead of, behind or between slugs of aqueous organic polymer solution. Specific examples include all-external and water-external micellar dispersions, sometimes referred to variously as micellar solutions, microemulsions, transparent emulsions, soluble oils and the like. Examples of specific agents are found in U.S. Pat. No. 3,163,214 to Csaszar; U.S. Pat. No. 3,500,922 to O'Brien et al.; U.S. Pat. Nos. 3,482,632, 3,500,918, 3,500,919, 3,512,586, 3,537,520 and 3,697,424 to Holm; U.S. Pat. Nos. 3,254,714 and 3,275,075 to Gogarty et al.; U.S. Pat. Nos. 3,506,070 and 3,506,071 to Jones; U.S. Pat. No. 3,497,006 to Jones et al.; U.S. Pat. Nos. 3,330,344 and 3,348,611 to Reisberg; U.S. Pat. No. 3,373,809 to Cooke, Jr.; U.S. Pat. No. 3,149,669 to Binder et al.; U.S. Pat. No. 3,208,515 to Meadors; U.S. Pat. No. 3,208,517 to Binder, Jr. et al.; U.S. Pat. No. 3,354,953 to Morse; and U.S. Pat. No. 3,714,062 to Askew et al.

The invention is further described by the following examples which are illustrative of specific modes of practicing the invention and are not intended as limiting the scope of the invention defined by the appended claims.

EXAMPLE 1

A series of tests are made to demonstrate the effect of shear on the viscosity of three aqueous polymer solutions made using a fresh water having the following properties:

| | | |
|---|---|---|
| pH | 7.0 | |
| $Na^+$ | 30 | p.p.m. |
| $Ca^{++}$ | 18 | p.p.m. |
| $Mg^{++}$ | 5 | p.p.m. |
| $Cl^-$ | 56 | p.p.m. |
| $HCO_3^-$ | 36 | p.p.m. |
| $SO_4^{--}$ | 19 | p.p.m. |
| Total Dissolved Solids | 164 | p.p.m. |

Run 1 is a blank for comparison purposes using as the polymer a partially hydrolyzed polyacrylamide (Dow Pusher 700). Run 2 is also a blank for comparison purposes using as the polymer a heteropolysaccharide (Enjay B-9702). Run 3 illustrates the composition of this invention and employs a mixture of the partially hydrolyzed polyacrylamide and the heteropolysaccharide. Each composition is prepared by adding the particulate polymer or polymers to water and stirring to form the aqueous polymer solution. The viscosity of each solution is determined using a Brookfield Model LVT Synchror-Lectric viscometer equipped with a U.L. adapter. Measurements are made at various rates of rotation of the spindle of the viscometer. Each solution is then repeatedly sheared by flowing it through a 100 centimeter long, 0.16 centimeter inside diameter capillary under a pressure of from 0.7 to 2.7 atmospheres. The viscosity is remeasured following each passage through the capillary. The results of these tests are given in following Table 1. These results show that shear decreases the viscosity of the partially hydrolyzed polyacrylamide aqueous solution, i.e., Run 1. However, shear has virtually no effect on the viscosity of the heteropolysaccharide solution, i.e., Run 2. This resistance to shear degradation is also found in the polymer solution containing both partially hydrolyzed polyacrylamide and heteropolysaccharide, i.e., Run 3.

TABLE 1
EFFECT OF SHEAR ON THE VISCOSITY OF AQUEOUS POLYMER SOLUTIONS

| Run | Polymer in Aqueous Solution (p.p.m.) | Shear ($sec^{-1}$) | Viscosity at Various R.P.M. of Viscometer (cps) | | | | |
|---|---|---|---|---|---|---|---|
| | | | 0.6 r.p.m. | 1.5 r.p.m. | 3 r.p.m. | 6 r.p.m. | 12 r.p.m. |
| 1 | 1,000 Dow Pusher 700 | None | 122 | 88 | 67 | 50 | 37 |
| 1 | " | 2,260 | 122 | 87 | 66 | 50 | 37 |
| 1 | " | 5,000 | 120 | 87 | 66 | 50 | 37 |
| 1 | " | 9,200 | 118 | 85 | 65 | 49 | 36 |
| 1 | " | 16,300 | 110 | 83 | 63 | 48 | 35 |
| 1 | " | 20,900 | 97 | 75 | 59 | 45 | 33 |
| 2 | 1,000 Enjay B-9702 | None | 50 | 38 | 31 | 25 | 19 |
| 2 | " | 5,700 | 48 | 37 | 30 | 24 | 19 |
| 2 | " | 9,500 | 49 | 39 | 31 | 25 | 19 |
| 2 | " | 17,500 | 51 | 39 | 32 | 25 | 19 |
| 2 | " | 29,200 | 51 | 39 | 32 | 25 | 19 |
| 3 | 500 Dow Pusher 700 + 500 Enjay B-9702 | None | 66 | 49 | 40 | 31 | 24 |
| 3 | " | 11,500 | 64 | 49 | 40 | 31 | 24 |
| 3 | " | 17,700 | 66 | 50 | 40 | 31 | 23.7 |
| 3 | " | 24,600 | 64 | 48 | 39 | 30.6 | 23.5 |
| 3 | " | 30,700 | 64 | 48 | 39 | 30.2 | 23.2 |

EXAMPLE 2

A series of tests are made to demonstrate the effect of water-soluble salts on the viscosity of three aqueous polymer solutions made using distilled water to which various amounts of sodium chloride has been added. Run 4 utilizes as the polymer a partially hydrolyzed polyacrylamide (Dow Pusher 700). Run 5 utilizes a heteropolysaccharide (Enjay B-9702). Run 6 illustrates the composition of this invention and utilizes a mixture of the partially hydrolyzed polyacrylamide and the heteropolysaccharide. Each composition is prepared by adding the particulate polymer or polymers to water containing the added salt and stirring to form the aqueous polymer solution. The viscosity of each solution is determined using a Brookfield Model LVT Synchro-Lectric viscometer equipped with a U.L. adapter. Measurements are made at various rates of rotation of the spindle of the viscometer. The results of these tests are given in following Table 2. These results show that increasing salt content sharply lowers the viscosity of aqueous solutions of partially hydrolyzed polyacrylamide, Run 4. Salt content has no appreciable effect on the viscosity of aqueous solutions of heteropolysaccharide, Run 5. The viscosity of aqueous solutions containing both partially hydrolyzed polyacrylamide and heteropolysaccharide are somewhat affected by salt content, but the viscosity remains sufficiently high to enable the composition to be used as a mobility control agent in waterflooding.

Table 2
EFFECT OF SALT CONTENT ON THE VISCOSITY OF AQUEOUS POLYMER SOLUTIONS

| Run | Polymer in Aqueous Solution (p.p.m.) | Salt Added (p.p.m. NaCl) | Viscosity of Various R.P.M. of Viscometer (cps.) | | |
|---|---|---|---|---|---|
| | | | 1.5 r.p.m. | 3 r.p.m. | 6 r.p.m. |
| 4 | 1,000 Dow Pusher 700 | 100 | 166 | 116 | 80 |
| 4 | " | 1,000 | 59 | 48 | 37 |
| 4 | " | 10,000 | 14 | 11 | 10 |
| 4 | " | 100,000 | 7 | 6 | 5 |
| 5 | 2,000 Enjay B-9702 | 100 | 101 | 73 | 50 |
| 5 | " | 1,000 | 96 | 70 | 49 |
| 5 | " | 10,000 | 98 | 70 | 49 |
| 5 | " | 100,000 | 98 | 69 | 47 |
| 6 | 500 Dow Pusher 7004 1000 Enjay B-9702 | 100 | 146 | 101 | 69 |
| 6 | " | 1,000 | 86 | 64 | 46 |
| 6 | " | 10,000 | 44 | 35 | 27 |
| 6 | " | 100,000 | 36 | 29 | 23 |

Thus, the foregoing tests of Examples 1 and 2 show that aqueous solutions of the polymer mixture of this invention are superior to solutions of polyacrylamide alone as to resistance to viscosity reduction by either increased salt content or by shear. The polymer mixture is preferred to heteropolysaccharide used alone in that the former imparts a higher viscosity to solutions of relatively low salt content.

EXAMPLE 3

This example illustrates the effectiveness of the aqueous solution of the two polymers in recovering residual oil from a core. A Nevada 130 sand pack core (length, 69 centimeters; diameter, 3.8 centimeters) is mounted in a plastic core holder equipped with pressure fittings on its opposite faces so that desired liquids can be forced lengthwise through the core. The core is first placed in a simulated restored state (as it might exist in an oil- and water-bearing formation) by saturating it first with a synthetic brine having the following properties:

| | |
|---|---|
| pH | 7.0 |
| $Na^+$ | 25,700 p.p.m. |
| $Ca^{++}$ | 1,010 p.p.m. |
| $Mg^{++}$ | 270 p.p.m. |
| $Cl^-$ | 42,100 p.p.m. |
| $HCO_3^-$ | 510 p.p.m. |
| $SO_4^{--}$ | nil |
| Total Dissolved Solids | 69,600 p.p.m. |

Van, Texas crude oil is then flowed through the core until no more brine is displaced. Oil saturation is then 81.0 percent. The core is then sequentially flooded with various solutions as shown in Table 3.

TABLE 3

| Flooding Fluid (percent pore volume) | |
|---|---|
| 4.0 | Fresh water containing 200 p.p.m. Dow Pusher 700 and 200 p.p.m. Enjay B-9702 |
| 3.0 | Soluble oil* (miscible displacement slug) |
| 10.0 | Fresh water containing 500 p.p.m. Dow Pusher 700 and 500 p.p.m. Enjay B-9702 |
| 10.0 | Fresh water containing 400 p.p.m. Dow Pusher 700 and 400 p.p.m. Enjay B-9702 |
| 10.0 | Fresh water containing 300 p.p.m. Dow Pusher 700 and 300 p.p.m. Enjay B-9702 |
| 10.0 | Fresh water containing 200 p.p.m. Dow Pusher 700 and 200 p.p.m. Enjay B-9702 |
| 10.0 | Fresh water containing 100 p.p.m. Dow Pusher 700 and 100 p.p.m. Enjay B-9702 |
| 10.0 | Fresh water containing 50 p.p.m. Dow Pusher 700 and 50 p.p.m. Enjay B-9702 |
| 73 | Fresh water |

*Solution containing 9.0 volume percent mixed petroleum sulfonates, 1.0 volume percent ethylene glycol monobutyl ether, 40 volume percent crude oil and 50 volume percent fresh water.

After a total of 1.4 pore volumes of flooding fluids have been injected into the core as described above, oil recovery reaches 95 percent of the original oil in place.

Various embodiments and modifications of this invention have been described in the foregoing specification, and further modifications will be apparent to those skilled in the art. Such modifications are included within the scope of this invention as defined by the following claims.

Having now described my invention, I claim:

1. A waterflooding composition exhibiting a high viscosity and resistance to shear degradation and which retains these properties upon admixture with water-soluble salts comprising an aqueous liquid containing from 0.005 to 5 weight percent of a polymer mixture comprising 25 to 75 weight percent of a heteropolysaccharide produced by genus Xanthomonas and 75 to 25 weight percent of a polyacrylamide or a partially hydrolyzed polyacrylamide having a molecular weight of from $0.5 \times 10^6$ to $40 \times 10^6$.

2. The composition as defined in claim 1 wherein the aqueous liquid is fresh water or brine.

3. The composition as defined in claim 1 wherein the heteropolysaccharide is produced by the species *Xanthomonas campestris*.

4. The composition as defined in claim 3 wherein the heteropolysaccharide is B-1459.

5. The composition as defined in claim 1 wherein from about 12 to about 45 percent of the carboxamide groups of the polyacrylamide have been hydrolyzed to carboxyl groups.

* * * * *